W. E. FRANK.
HOSE REEL.
APPLICATION FILED MAY 3, 1915.

1,185,301.

Patented May 30, 1916.

Inventor,
William E. Frank.
By Bakewell & Cornwell attys.

UNITED STATES PATENT OFFICE.

WILLIAM E. FRANK, OF ST. LOUIS, MISSOURI, ASSIGNOR TO FOSTER BROS. MANUFACTURING COMPANY, OF ST. LOUIS, MISSOURI, A CORPORATION OF MISSOURI.

HOSE-REEL.

1,185,301.

Specification of Letters Patent. Patented May 30, 1916.

Application filed May 3, 1915. Serial No. 25,504.

*To all whom it may concern:*

Be it known that I, WILLIAM E. FRANK, a citizen of the United States, residing at St. Louis, Missouri, have invented a certain new and useful Improvement in Hose-Reels, of which the following is a full, clear, and exact description, such as will enable others skilled in the art to which it appertains to make and use the same.

This invention relates to hose reels, and has for its main object to provide a hose reel which is so constructed that a hose lying on the ground can be wound onto the reel automatically by simply moving the reel as an entirety longitudinally of the hose.

Another object is to provide a hose reel that comprises a carriage or movable supporting structure, a drum or similar device on said carriage onto which a hose is adapted to be wound and means for causing said drum to turn or rotate when the carriage is in motion.

Another object is to provide a hose reel of the character just described which comprises means for securely holding the drum at rest when the carriage is in motion, thereby eliminating the possibility of the hose unwinding from the drum when the carriage is moved from place to place or dragged up or down a flight of steps.

Another object is to provide a hose reel of the character described that comprises means whereby the hose drum can be either securely locked against rotation, or caused to rotate when the carriage is in motion, or caused to remain at rest or turn freely when the carriage is either in motion or at rest. And still another object is to provide a strong and serviceable garden hose reel that presents a neat and ornamental appearance and which can be manufactured at a low cost.

Other objects and desirable features of my invention will be hereinafter pointed out.

Figure 1:
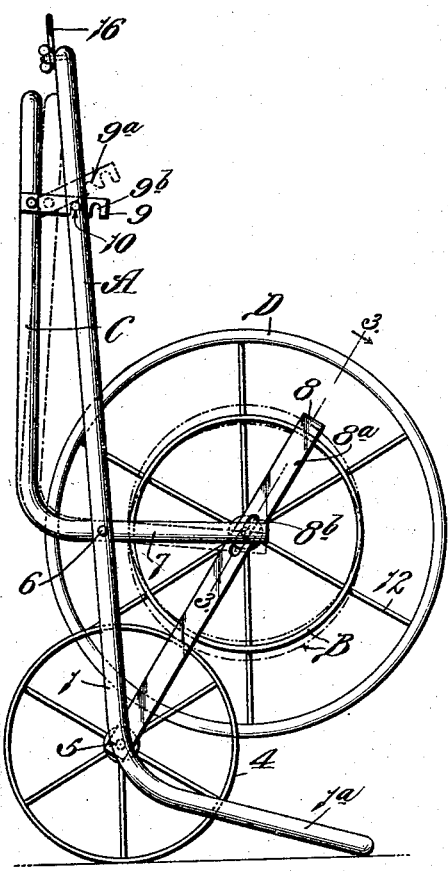
Figure 2:
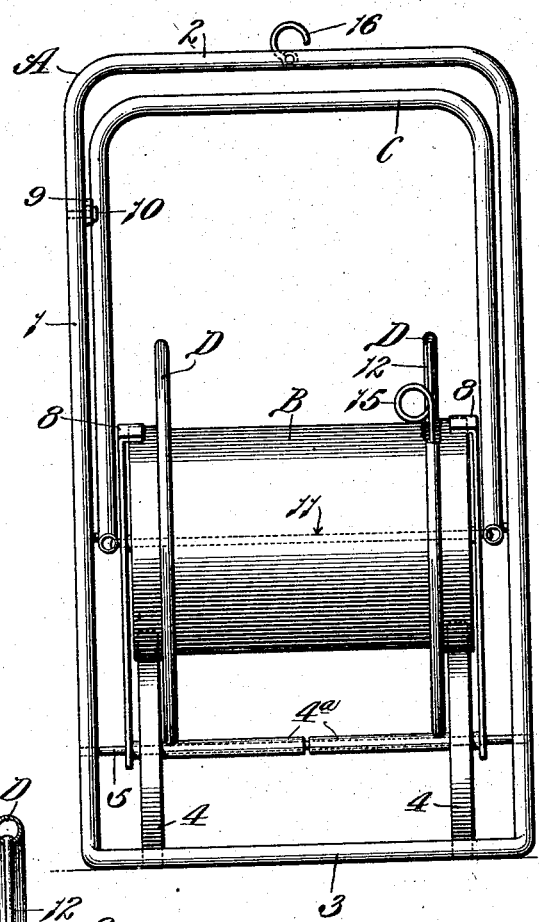
Figure 3:
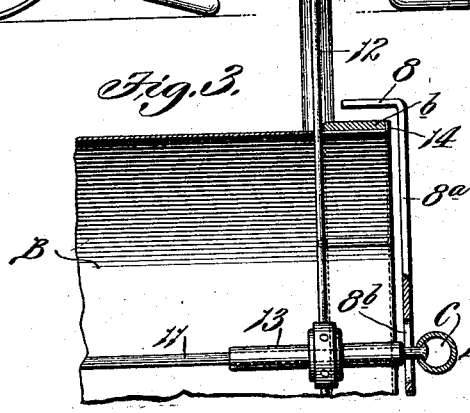

Figure 1 of the drawings is a side elevational view of a garden hose reel constructed in accordance with my invention. Fig. 2 is a front elevational view of said reel; and Fig. 3 is a cross-sectional view of a portion of the reel taken on the line 3—3 of Fig. 1.

In the preferred form of my invention as herein shown the traction wheels of the carriage are utilized to drive the hose drum or impart rotary movement to the drum when the carriage is in motion, and means are provided for shifting the hose drum relatively to the traction wheels of the carriage so as to govern the operation of the drum. I do not wish it to be understood, however, that my invention is limited to a reel of this construction, as various means could be employed for causing the drum to rotate when the carriage is in motion and for causing the drum to remain at rest or to be locked without departing from the spirit of my invention.

Referring to the drawings, which illustrate the preferred form of my invention, A designates the carriage of the reel which preferably consists of a piece of tubing bent to form two vertically-disposed side members 1 connected together at their upper ends by a handle piece 2 and provided at their lower ends with forwardly-projecting extensions 1ᵃ that are joined together by a cross piece or base rest 3, thus forming a substantially inverted U-shaped frame that is provided at its lower end with a forwardly-projecting, yoke-shaped portion that bears upon the ground, and thus holds the frame in an upright position. Said frame is equipped with traction wheels 4 which are preferably loosely mounted on a shaft or axle 5 that is supported by the vertical side members 1 of the carriage, each of said wheels having a relatively long, tubular-shaped hub 4ᵃ that turns freely on the axle 5 and which is of sufficient length to hold a quantity of lubricant. A drum B or hose support is rotatably mounted in a shiftable frame C that is pivotally connected at 6 to the vertical side members 1 of the carriage A; said support C being preferably formed of a piece of tubing bent to form an inverted U-shaped frame that is provided at its lower end with forwardly-projecting arms 7 which support the drum B. The drum B is so arranged with relation to the traction wheels 4 of the carriage A that the end portions of the drum will bear upon said traction wheels when the shiftable frame C is in one position and thereby cause the drum to rotate when the carriage A is in motion. When the frame C or shiftable support is moved rearwardly a certain distance the forwardly-projecting arms 7 at the lower end of said frame will be tilted upwardly sufficiently to disengage the drum B from the traction wheels 4 of the carriage. When the frame C is moved still farther in the direction mentioned the end portions of the drum B will be engaged by brakes 8 that securely lock the drum and prevent it from turning, the brakes 8 being preferably formed by laterally-projecting flanges on the upper ends of side bars 8ª which are pivotally connected at their lower ends to the axle 5 on which the traction wheels 4 turn.

Means are provided for holding the shiftable frame C in such a position that the drum B will turn freely or will be securely locked by the brakes 8, the means herein shown for this purpose consisting of a pivotally mounted latch 9 on the frame C that is provided with two notches 9ª and 9ᵇ, either of which will receive a laterally-projecting pin or stop 10 on one of the side members 1 of the frame A. When the notch 9ª on said latch is in engagement with the stop 10 the hose drum B will be in such a position that it can turn freely, both when the carriage A is in motion and at rest and when the notch 9ᵇ in said latch is in engagement with said stop 10, the drum B will be securely locked by the frictional pressure that the brakes 8 exert on the end portions of said drum. I prefer to arrange bands or rings $b$ on the end portions of the drum B so that said bands will coöperate with the traction wheels 4 and with the brakes 8, but it will, of course, be understood that the traction wheels and the brakes could act directly upon the drum, instead of on an intermediate member or members. Furthermore, while I prefer to mount the driving members $b$ for the drum directly on the drum, this is not essential, so long as the members $b$ are combined with the drum B in such a manner that said drum will rotate when the members $b$ are in frictional engagement with the traction wheels 4.

The drum B turns freely on a shaft or axle 11 that is supported by the forwardly-projecting arms 7 on the shiftable frame C, and the brake bars 8ª are preferably provided with elongated slots 8ᵇ through which the axle 11 passes, so as to cause the brake bars 8ª to shift or change their position when the frame C is moved, and thus hold the brakes 8 in such a position that they will bear evenly upon the members $b$.

The drum B is of novel construction and preferably consists of a hollow, cylindrical-shaped metal member formed from galvanized iron or some other suitable sheet material and combined with two hand wheels D whose spokes 12 project laterally through the drum, each of said hand wheels having a relatively long, tubular-shaped hub 13, as shown in Fig. 3, that turns freely on the axle or shaft 11. The end portions of the drum B are provided with longitudinal slots so that the spokes 12 of said hand wheels can be slipped into same, and after said hand wheels have been arranged in proper position and the bands $b$ have been slipped over the end portions of the drum, the extreme ends of the drum are flanged outwardly or upset at 14, as shown in Fig. 3, so as to confine said bands $b$ in position, said bands $b$ in turn bearing against the spokes 12 of the hand wheels D, and thus preventing said wheels from becoming displaced with relation to the drum.

From the foregoing it will be seen that the drum or hose support B of my improved reel is formed from two wheels, a cylindrical-shaped sheet metal member provided at its ends with slots for receiving the spokes of said wheels, bands $b$ surrounding the end portions of said cylindrical-shaped member and bearing against the spokes of the wheels and upset portions or flanges at the extreme ends of said cylindrical-shaped member that securely hold all of said parts together without the aid of rivets or other suitable fastening devices. If desired, a spoke of one of the wheels D can be bent so as to form a loop 15, as shown in Fig. 2, for receiving one end of the hose and the handle 2 of the carriage A can be provided with a hook 16 for receiving the other end of the hose after it has been wound onto the drum B.

In using my improved reel one end of a hose that is lying on the ground is inserted through the loop 15 and the retaining latch 9 for the frame C is lifted upwardly so as to permit the frame C to assume such a position that the members $b$ on the end portions of the hose drum will bear upon the traction wheels 4 of the carriage A. Thereafter, said carriage is moved longitudinally of the hose, the rotary movement of the traction wheels 4 causing the drum B to be revolved and thus wind the hose onto same. By referring to Fig. 1, it will be noted that the drum B and the traction wheels 4 are of the same diameter, therefore, when the drum is in engagement with the wheels, a point on its periphery will rotate the same distance as the traction wheels travel over the ground, thus enabling the hose to be wound up on said drum while the reel is being moved longitudinally of the hose without dragging the hose. In other words, the hose will be wound up on the drum B in the same proportion as the travel of the wheels over the ground, that is, if the reel is moved over the ground for a distance of ten feet, the hose drum, being of the same diameter as the traction wheels, will wind up ten feet of hose.

After the hose has been wound onto the drum B the frame C is tilted rearwardly so as to shift the drum B upwardly, and thus cause the brakes 8 to tightly engage the members $b$ and securely lock the drum against rotation, the frame C being held in this position by the notch $9^b$ in the retaining latch and the coöperating projection 10 on the vertical side member of the carriage A. When the drum B is locked in this manner it is possible to move the carriage A from place to place and also drag it up or down a flight of steps without liability of the drum B turning and thus permitting the hose to unwind. When it is desired to unwind the hose the notch $9^a$ of the retaining latch is arranged in engagement with the projection 10, so as to hold the frame C in such a position that the members $b$ on the drum will not engage either the traction wheels 4 or the brakes 8, thus permitting the drum B to turn freely. It is, of course, possible to positively rotate the drum B rearwardly so as to unwind the hose from same by arranging the frame C in such a position that the traction wheels 4 on the carriage will bear upon the members $b$ of the drum, and thus cause the drum to rotate when the carriage A is moved away from the free end of the hose that has been placed on the ground. The drum B is heavy enough to insure sufficient frictional pressure of the members $b$ on the traction wheels 4 to cause the drum B to rotate when the carriage A is in motion, and when the frame C is arranged in the position indicated in broken lines in Fig. 1, but if, for any reason, the drum should tend to stick or not turn freely, due to insufficient frictional engagement between the traction wheels 4 and the members $b$, this can be overcome easily by pressing the upper end of the frame C forwardly so as to force the members $b$ of the drum tightly against the traction wheels 4 of the carriage A.

A hose reel of the construction above described is a decided improvement on the hose reels now in general use, owing to the fact that it overcomes the necessity of manually turning the hose-supporting drum to wind the hose onto same, the reel being so constructed that a hose can be wound onto the drum automatically by simply moving the reel as an entirety longitudinally of the hose. The reel presents a neat and ornamental appearance and it can be manufactured at a low cost, in view of the novel manner in which the various elements of the carriage, the shiftable frame and the drum are combined. While I have herein illustrated my invention embodied in a hose reel in which both of the traction wheels on the carriage are utilized to turn the drum or hose-supporting member of the reel, it will, of course, be understood that the reel can be so constructed that the drum will be driven by only one of the traction wheels or by a rotatable member separate and distinct from the traction wheels.

Having thus described my invention, what I claim, and desire to secure by Letters Patent, is:

1. A hose reel comprising a carriage provided with a wheel that turns when the carriage is in motion, a shiftable frame on said carriage, a rotatable hose drum on said frame that is adapted to be driven by said wheel when said frame is arranged in a certain position, and means for locking said drum so as to prevent it from turning when said frame is in a different position.

2. A hose reel comprising a carriage provided with a wheel that turns when the carriage is in motion, a shiftable frame on said carriage, a rotatable drum on said frame that is adapted to be driven by said wheel when said carriage is in a certain position, a locking device for preventing rotary movement of said drum, and means whereby said frame can be arranged in such a position that said drum will either be locked securely against rotary movement or will be free to rotate independently of said wheel.

3. A hose reel comprising a carriage provided with a wheel that turns when the carriage is in motion, a shiftable support on said carriage, a rotatable drum on said support that is adapted to be driven by said wheel when said support is in a certain position, and a brake that locks said drum so as to prevent it from rotating when said support is in a different position.

4. A hose reel, comprising a carriage provided with traction wheels, a pivotally mounted frame on said carriage, a rotatable hose drum on said frame arranged in such a position that the end portions of same will coöperate with said traction wheels to cause the drum to turn when said frame is in a certain position, hand wheels on said drum, means for locking said frame in adjusted position, and a brake that is adapted to lock the drum against rotary movement in one position of said frame.

5. A hose reel, comprising a carriage provided with traction wheels, said carriage having vertically-disposed side members whose upper ends are connected together by a handle, a pivotally mounted frame on said carriage having a portion that is arranged in proximity to the handle on said carriage, and a rotatable hose drum on said frame that is adapted to be driven by said traction wheels.

6. A hose reel, comprising a carriage equipped with traction wheels and having an inverted U-shaped frame which is provided at its lower end with a forwardly-projecting, yoke-shaped portion that is adapted to engage the ground and thus hold the frame in an upright position, a substantially inverted U-shaped support pivotally mounted on said frame provided with forwardly-projecting arms, and a rotatable hose drum carried by said arms.

7. A hose reel, comprising a carriage equipped with traction wheels and having an inverted U-shaped frame which is provided at its lower end with a forwardly-projecting, yoke-shaped portion that is adapted to engage the ground and thus hold the frame in an upright position, a substantially inverted U-shaped support pivotally mounted on said frame provided with forwardly-projecting arms, a rotatable hose drum carried by said arms, a latch for holding said support in adjusted position, and brake bars having portions that are adapted to engage said drum and hold it against rotary movement when said support is in a certain position.

8. A hose reel, comprising a carriage whose frame is formed from a piece of tubing bent to form two vertically-disposed side members, a handle piece and a forwardly-projecting base rest, an axle carried by said frame, traction wheels provided with relatively long, tubular-shaped hubs that turn on said axle, a shiftable support pivotally mounted on said frame and formed from tubing, and a hose drum rotatably mounted on said support in such a manner that said traction wheels will bear against the end portions of same and thus cause said drum to rotate when said support is in a certain position.

9. A hose reel, comprising a carriage whose frame is formed from a piece of tubing bent to form two vertically-disposed side members, a handle piece and a forwardly-projecting base rest, an axle carried by said frame, traction wheels provided with relatively long, tubular-shaped hubs that turn on said axle, a shiftable support pivotally mounted on said frame and formed from tubing, a hose drum rotatably mounted on said support in such a manner that said traction wheels will bear against the end portions of same and thus cause said drum to rotate when said support is in a certain position, brake bars pivotally connected at their lower ends to said axle and provided at their upper ends with brakes that are adapted to engage said drum, and means for holding said brake bars in such a position that the brakes thereon will be properly positioned with relation to said drum.

10. A hose drum formed from a hollow, cylindrical-shaped member constructed of sheet metal provided at its ends with longitudinally-extending slots, hand wheels arranged adjacent the ends of said member with their spokes in said slots, bands surrounding the end portions of said member, and portions on said member that are bent into engagement with said bands so as to hold said bands and hand wheels in operative position.

In testimony whereof I hereunto affix my signature in the presence of two witnesses, this twenty ninth day of April 1915.

WILLIAM E. FRANK.

Witnesses:
WELLS L. CHURCH,
GEORGE BAKEWELL.

Copies of this patent may be obtained for five cents each, by addressing the "Commissioner of Patents Washington, D. C."